Patented Dec. 13, 1932

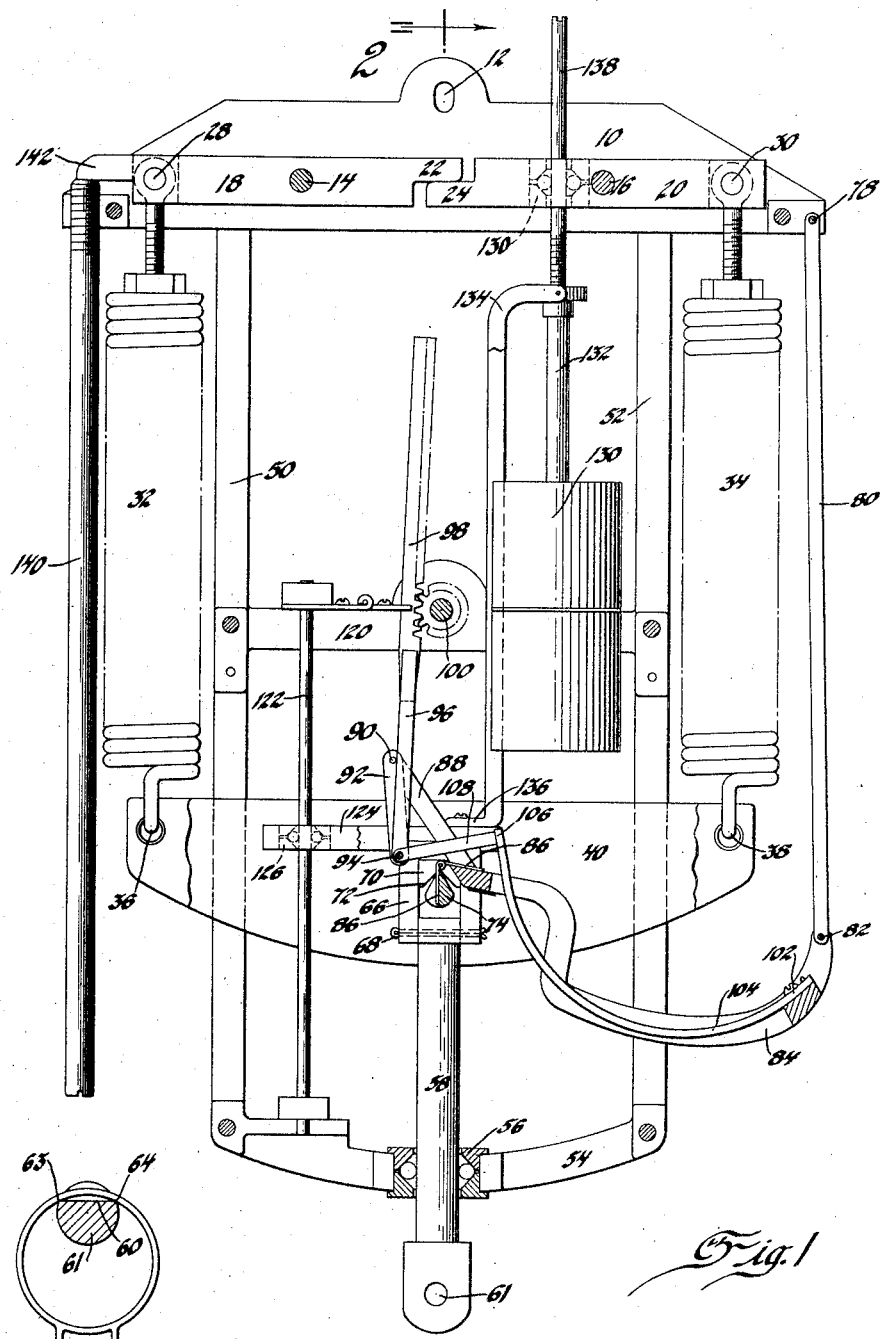

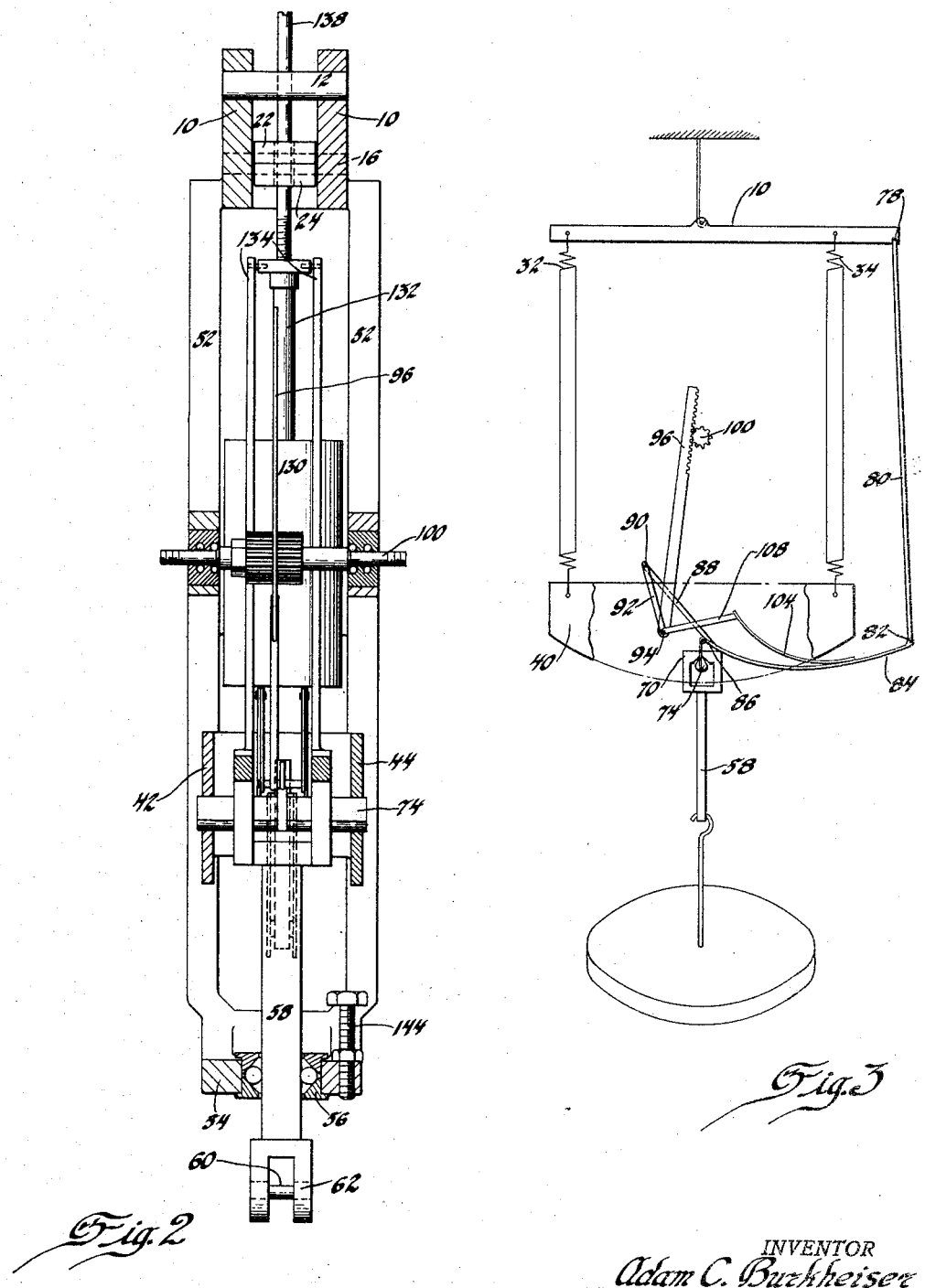

1,890,569

UNITED STATES PATENT OFFICE

ADAM C. BURKHEISER, OF DETROIT, MICHIGAN, ASSIGNOR TO THE STANDARD COMPUTING SCALE COMPANY, OF DETROIT, MICHIGAN, A CORPORATION OF MICHIGAN

SCALE

Application filed November 10, 1930. Serial No. 494,507.

This invention relates to scales and more particularly to so called "hanging" scales.

An object of this invention is a hanging scale provided with a novel form of pivotal connection between a weighing rod and a rack rod, one that may be varied by a suitably mounted thermostat to compensate for weather conditions.

A further object is a novel form of guiding means for moving parts of a scale.

Still further objects will readily occur to those skilled in the art upon reference to the following description and the accompanying drawings in which Fig. 1 is a view of the major parts of the scale, parts being broken away for purposes of clarity.

Fig. 2 is a central section of Fig. 1, on line 2—2.

Fig. 3 is a diagrammatic view to small scale, of the variable connections referred to above.

Fig. 4 shows a detail.

As indicated on the drawings, the scale includes a stationary frame element or cross bar 10 which is adapted to be suspended from a suitable support, the suspension means being connected to a bar 12 connecting cross bar parts. Secured to the cross bar, by means of pivots 14 and 16 are the spring adjusting bars 18 and 20, these last having overlapping portions 22 and 24 for a purpose to be described. The bars 18 and 20 have secured to their outer ends at 28 and 30 the coiled springs 32 and 34, to the lower ends of which, at 36 and 38, is secured the movable cross bar 40, the latter including two spaced portions 42 and 44 (Fig. 2) between which are disposed the parts forming the major part of the invention.

Depending from the stationary cross bar 10 are rods or bars 50, 52 whose lower ends are connected by a stationary bridge piece 54, in which is disposed a suitable bearing, such as the ball bearing indicated at 56, the latter forming a guide for the weighing rod 58 from whose lower end is suspended a weighing pan (not shown), the suspension means 59 passing over the flat portion 60 of a pin 61 disposed in aperture 62 of rod 58. It will be seen that sharp edges 63 and 64 are presented over which is suspended the hanger 59, as seen in Fig. 4, the sharp edges preventing excessive vibration of the pan.

The upper end of the weighing rod 58 is provided with a U-shaped stirrup, 66 connected thereto by a pin 68, and fixedly disposed in the stirrup is an agate bearing 70, in whose scarf 72 is disposed a knife edged bar 74, the latter being rigidly secured to the parts 42 and 44 of the movable cross bar 40. It will be seen that downward pull on the rod 58 will effect a correspondingly unmultiplied, downward pull on the springs 32 and 34, and that measurement of the downward movement of the parts will indicate the weight placed upon the scale pan.

Pivotally connected to the stationary cross bar 10 at the point 78 is a rod 80 to whose lower end at 82, is pivotally connected a swinging arm 84, the free end of the arm being connected to the knife edged bar 74 by means of the leaf hinge 86. The free end of the arm is also connected to a link 88 which in turn is pivotally connected at 90, to a second link 92, the latter in turn being pivotally connected at 94 to the rack rod 96, whose racked face 98 engages the pinion 100 connected to the indicating needle (not shown). It will be seen that downward movement of the knife edge bar 74, in response to the effect of the weight upon the weighing pan, will permit the swinging arm 84 to move downwardly, thus causing links 88 and 92, and rack rod 96 to move downwardly, thereby effecting weight indicating rotation of the pinion 100.

In spring scales, such as the one described, it is desirable to provide a thermostatic control to compensate for the changing conditions of the scale parts, and accordingly a thermostatic control, which will now be described, has been provided. Secured to the arm 84 at the point 102 is a bimetallic, thermally sensitive strip 104, the free end 106 of the strip being secured to a link 108 which is pivotally connected at 94 to the rack rod 96 and to the swinging links 88 and 92. It will be seen that movement of the free end 106 of the strip will cause a change in the relative positions of the weight indicating parts, and a change in the relative weighing ratios, such as is desired in scales of this character.

In order to guide the weighing parts in their movement and to insure their moving only in the desired paths, there are provided guiding means such as those now to be described.

Connecting the rods or bars 50, 52 at intermediate points in their length, is an upper bridging element 120, between which and the lower bridge 54 is a vertical rod 122. The stirrup 66 is provided with a plate 124 on its upper surface, and disposed within the plate 124 is a ball bearing 126 surrounding the rod 122.

Dashpot means for the scale are provided, such means including a cylinder 130 secured to the bridging member 120 and containing a piston (not shown) whose rod 132 is connected to a yoke 134 connected at its lower end 136 to the plate 124. It will be seen that the dashpot serves as a guide for the rod 58 as well as a cushion for its movement. The connection between the rod 132 and the yoke 134 is rendered adjustable by any suitable means, such as the one shown which includes an adjusting screw 138, passing thru a ball bearing 139 in the cross bar 140.

In order to provide for a zero adjustment of the springs 32 and 34, there is threaded thru the stationary cross bar 10, an adjusting screw or rod 140, the latter bearing against the under surface of an extension 142 of the pivotally mounted bar 18. Movement of the screw 140 upwardly will cause elevation of the left hand end of the bar 18, and consequent stretching of the spring 32. Simultaneously, the right hand end of the pivotally mounted bar 20 will be elevated, due to the overlapping connecting parts 22 and 24, thus causing equal stretching of the spring 34. Correspondingly, downward movement of the screw 140 will permit contraction of the springs 32 and 34, as will be understood.

Further, in order to prevent excessive downward movement of the movable cross bar 40, there is threaded into the bridge 54, a screw 144 (Fig. 2) positioned in the path of movement of the cross bar 40. If the screw be made long enough or if it be replaced by a long screw, it will also be useful as a shipment locking screw, since it can lift the rod stirrup 66 off the knife edge bar 74.

Accordingly, it will be observed that there has been provided, in a scale of the so-called "hanging type", a thermostatic control for the weight indicating parts, one that is simple, and accurate, and not easily affected by working conditions.

Further, it will be seen that there has been provided means for guiding moving parts of scales of this character.

Now having described the invention and the preferred embodiment thereof, it is to be understood that the said invention is to be limited, not to the specific details herein set forth, but only by the scope of the claims which follow:

What I claim is:—

1. In a scale, a supporting frame, load resisting springs, spring adjusting means carried by said frame and in turn carrying said springs, a movable cross bar connecting said springs and supported thereon, a knife edged bar secured to and positioned so as to be perpendicular to said cross bar, load supporting means suspended on said knife edged bar, an arm pivotally connected to said knife edged bar, an indicator moving rack and means operatively connecting said rack to said arm.

2. In a scale, a supporting frame, load springs carried thereby, a movable cross bar connecting said springs and supported thereon, a knife edged bar secured to and positioned so as to be perpendicular to said cross bar, load supporting means suspended on said knife edged bar, an arm pivotally connected to said knife edged bar, an indicator moving rack, means operatively connecting said rack and said arm thru suitable linkage, and a thermostat means operatively connecting said rack and said arm.

3. In a scale, a supporting frame, load springs supported thereby, a movable cross bar connecting said springs and supported thereon, a knife edged bar secured to and positioned so as to be perpendicular to said cross bar, load supporting means suspended on said knife edged bar, an arm pivotally connected to said knife edged bar, an indicator moving rack, means operatively connecting said rack and said arm, the pivotal connection between said arm and said knife edged bar including a hinge, one of the leaves of the hinge being connected to said bar and the other to said arm.

4. In a scale, a supporting frame, load springs supported thereby, a movable cross bar connecting said springs and supporting a knife edged bar secured to and positioned so as to be perpendicular to said cross bar, load supporting means suspended on said knife edged bar, an arm pivotally connected to said knife edged bar, an indicator moving rack, and means operatively connecting said rack and said arm, the load supporting means having a stirrup surrounding said knife edged bar and resting on the knife edge.

5. In a scale, a supporting frame, load springs supported thereby, a movable cross bar connecting said springs and supported thereon, a knife edged bar secured to and positioned so as to be perpendicular to said cross bar, load supporting means suspended on said knife edged bar, an arm pivotally connected to said knife edged bar, and an indicator moving rack, means operatively connecting said rack to said arm including a link rigidly attached to said arm and a second link pivotally attached to said first link and to said rack.

6. In a scale, a supporting frame, load springs supported thereby, a movable cross bar connecting said springs and supported thereon, a knife edged bar secured to and positioned so as to be perpendicular to said cross bar, load supporting means suspended on said knife edged bar, an arm pivotally connected to said knife edged bar, an indicator moving rack, means operatively connecting said rack and said arm including a link rigidly attached to said arm and a second link pivotally attached to said first link and to said rack, and a thermostat means operatively connecting said arm and said rack.

7. In a scale, a frame, load springs depending therefrom, a movable cross bar connecting said springs, a knife edged bar secured to and positioned so as to be perpendicular to said cross bar, load supporting means suspended on said knife edged bar, an arm pivotally connected to said knife edged bar, an indicator moving rack, means operatively connecting said rack and said arm, a stationary guiding rod connected to said frame, and an apertured member connected to the load supporting means and surrounding and engaging said guiding rod whereby the latter may guide the load supporting means in their movement.

8. In a scale, a supporting frame, load supporting springs carried thereby, a divided cross bar connecting said springs and supported thereby, a connecting member carried by said cross bar, load supporting means suspended on said connecting member, an arm pivotally connected to said connecting member, an indicator moving rack, means operatively connecting said rack and said arm, and a thermostat means operatively connecting said rack and said arm independent of the last mentioned connection.

ADAM C. BURKHEISER.